(12) United States Patent
Poon et al.

(10) Patent No.: US 10,679,020 B2
(45) Date of Patent: Jun. 9, 2020

(54) VOLTAGE REGULATION

(71) Applicant: IDEX ASA, Fornebu (NO)

(72) Inventors: Tuck Weng Poon, Hampshire (GB);
Peter Eckehard Kollig, Hampshire
(GB); Fred G. Benkley, III, Middleton,
MA (US)

(73) Assignee: IDEX Biometrics ASA, Oslo (NO)

( * ) Notice: Subject to any disclaimer, the term of this
patent is extended or adjusted under 35
U.S.C. 154(b) by 0 days.

(21) Appl. No.: 16/261,926

(22) Filed: Jan. 30, 2019

(65) Prior Publication Data

US 2019/0236321 A1  Aug. 1, 2019

Related U.S. Application Data

(63) Continuation-in-part of application No. 15/883,543, filed on Jan. 30, 2018.

(30) Foreign Application Priority Data

Mar. 12, 2018 (GB) .................................. 1803938.8

(51) Int. Cl.
*G06K 7/10* (2006.01)
*G06K 19/07* (2006.01)
*G06K 19/077* (2006.01)

(52) U.S. Cl.
CPC ..... *G06K 7/10158* (2013.01); *G06K 19/0709* (2013.01); *G06K 19/0718* (2013.01); *G06K 19/0723* (2013.01); *G06K 19/07769* (2013.01)

(58) Field of Classification Search
None
See application file for complete search history.

(56) References Cited

U.S. PATENT DOCUMENTS 7,364,083 B2   4/2008   Ogawa et al.
7,975,057 B2   7/2011   Guterman et al.
(Continued)

FOREIGN PATENT DOCUMENTS

GB   2508039 A   5/2014
GB   2531378 A   4/2016
(Continued)

OTHER PUBLICATIONS

International Search Report and Written Opinion dated Apr. 9, 2019 issued in International Application No. PCT/EP2019/052256. (16 pages).

(Continued)

*Primary Examiner* — Kristy A Haupt
(74) *Attorney, Agent, or Firm* — Rothwell, Figg, Ernst & Manbeck, P.C.

(57) ABSTRACT

A biometric module implemented on a single integrated circuit chip is configured to perform processing as part of a function associated with a device that performs contactless communication with a terminal. The module comprises a power-harvesting unit to induce a voltage from a wireless signal received at an antenna of the device; one or more components configured to process functions in the digital domain; one or more components configured to process functions in the analogue domain; and first and second voltage regulators each having inputs for receiving an input voltage induced by the power-harvesting unit. The first voltage regulator outputs a first voltage to the components processing functions in the analogue domain and the second voltage regulator outputs a second voltage lower than the first voltage to the components processing functions in the digital domain.

20 Claims, 6 Drawing Sheets

(56) References Cited

U.S. PATENT DOCUMENTS

| | | |
|---|---|---|
| 8,172,150 B2 | 5/2012 | Buhr et al. |
| 8,504,105 B2 | 8/2013 | Baldischweiler et al. |
| 8,698,594 B2 | 4/2014 | Erhart et al. |
| 9,460,329 B2 | 10/2016 | Erhart et al. |
| 9,760,757 B2 | 9/2017 | Erhart et al. |
| 10,043,053 B2 | 8/2018 | Erhart et al. |
| 2005/0077363 A1 | 4/2005 | Seo |
| 2013/0207786 A1 | 8/2013 | Hutzler et al. |
| 2016/0308371 A1 | 10/2016 | Locke et al. |
| 2016/0321441 A1 | 11/2016 | Tonoyan |
| 2017/0323166 A1 | 11/2017 | Colussi et al. |
| 2018/0253587 A1* | 9/2018 | Lowe ................. G06K 9/00087 |

FOREIGN PATENT DOCUMENTS

| | | | |
|---|---|---|---|
| WO | 2008104601 A2 | 9/2008 | |
| WO | 2010/019961 A2 | 2/2010 | |
| WO | WO-2010051117 A1 * | 5/2010 | ......... G06K 19/0701 |
| WO | 2017025481 A1 | 2/2017 | |

OTHER PUBLICATIONS

Non-Final Office Action dated Apr. 11, 2019 issued in corresponding U.S. Appl. No. 15/883,543. (11 pages).

Final Office Action dated Sep. 18, 2019 issued in corresponding U.S. Appl. No. 15/883,543. (12 pages).

\* cited by examiner

VOLTAGE REGULATION

CROSS REFERENCE OF RELATED APPLICATION

This application is a continuation-in-part of U.S. patent application Ser. No. 15/883,543, filed Jan. 30, 2018, and claims priority to British patent application no. GB 1803938.8 filed Mar. 12, 2018, the respective disclosures of which are incorporated herein by reference.

FIELD

This invention relates to voltage regulation within a device that receives power through contactless mechanisms, for example a contactless smart card.

BACKGROUND

A smart card may refer to a device that includes an embedded integrated circuit chip and internal memory. That internal memory may be located on the integrated circuit chip, or be a separate chip embedded within the card. A smart card may be a contact card; a contactless card, or may be capable of operating as a contact and a contactless card. Smart cards exist in a wide variety of form factors, including plastic cards, key fobs, watches, wearables, electronic passports and USB-based tokens and subscriber identification modules (SIMs) used in mobile phones.

A contact card communicates with a terminal (e.g., a card reader) by physically connecting to the terminal. For example, a contact card may comprise one or more contact pads that provide electrical connectivity to a terminal when the card and terminal are brought into suitable physical contact (e.g. by inserting the card into a slot within the terminal).

A contactless card communicates with a terminal without direct physical contact. Typically, a contactless card communicates with a terminal via radio waves. The contactless card may include an antenna to receive an electromagnetic signal, such as an RF signal, emitted from a terminal. Likewise, data from the card can be communicated back to the terminal by means of the card's antenna.

Some contactless cards are 'passive'. A passive card powers the embedded chip from energy harvested from the signal emitted by the terminal. One way to harvest energy from the emitted signal is to arrange the antenna as a coil that induces a voltage across its terminals by means of induction when receiving the emitted signal.

Smart card technology is being implemented within a variety of devices used to perform increasingly varied functions, for example to perform payments, grant a user physical access to a region of an environment, to store personal identification information of the user; identify or authenticate a user etc. In some cases, it may be desirable for a device to be capable of performing multiple different functions.

There are several difficulties faced when trying to implement multiple functionalities into a device using smart card technology, particularly when a device designed to perform a 'base' or primary function is adapted to perform additional functions. One problem is that industry standards governing smart card technology were originally designed for payment/authentication cards. Existing infrastructure has therefore been designed in compliance with these standards that is suitable for powering this primary function of facilitating payments or transactions, which may place constraints on the power that can be consumed by any additional functionality placed onto the card. This problem may be compounded by the fact the additional functions may consume more power and/or require power for a longer period of time than the primary function of the card. A further problem is that for cards operating in a contactless mode, the power drawn by the additional functionality may affect the load modulation of the signal emitted by the terminal, which may appear as extra noise to the terminal.

SUMMARY

According to the present invention there is provided a biometric module and device as set out in the appended claims.

BRIEF DESCRIPTION OF DRAWINGS

The present invention will now be described by way of example with reference to the accompanying drawings. In the drawings.

DETAILED DESCRIPTION

The present disclosure is directed to a device that is capable of contactless communication with a terminal. The device includes an antenna for receiving a wireless signal emitted by the terminal, and a module that is configured to perform processing as part of implementing a function associated with the device. That function might be, for example, biometric authentication of a user of the device. The module is arranged to have a digital domain and an analogue domain. The digital domain includes circuitry that performs processing in the digital domain, i.e. it performs digital processing. The analogue domain includes circuitry that performs processing in the analogue domain, i.e. it performs analogue processing. Both analogue and digital processing may be performed by the module as part of implementing the function associated with the device, but there might be certain portions or blocks of that processing that only require analogue and/or digital processing to be performed. The determination as to whether a block of processing requires analogue and/or digital processing may be performed by a controller unit within the device.

The module includes a power-harvesting unit for wirelessly harvesting energy from a signal emitted from a terminal and received at the device's antenna to power the card, including the module's processing. The power-harvesting unit induces a voltage from the signal received at the antenna. Voltage-regulator circuitry within the device generates regulated output voltages from the induced voltage for supplying to the circuitry of the module. The voltage-regulator circuitry includes two voltage-regulators arranged in parallel. The voltage regulators each operate to output a respective regulated voltage, with the regulated voltage of the first regulator being higher than the regulated voltage of the second regulator. The first regulator is arranged to output its regulated voltage to circuitry of the module that operates in the analogue domain, and the second regulator is arranged to output its regulated voltage to circuitry of the module that operates in the digital domain. In this way, different regulated voltages can be supplied to the digital and analogue domains of the module. This is convenient because it has been appreciated that analogue processing typically requires a higher voltage than digital processing.

In some examples, the regulator circuitry includes a switching element for selectively coupling the first voltage regulator to the power harvesting unit. The switching element can adopt a first position in which the first voltage regulator is disconnected from the power-harvesting unit and a second position in which the first voltage regulator is coupled to the power harvesting unit. The second voltage regulator may remain coupled to the power harvesting unit regardless of the position of the switching element. This arrangement enables the higher-power analogue domains of the module to be disconnected, i.e. switched off, when a block of processing can be performed wholly in the digital domain, which in turn means the input voltage from the power harvesting unit can be decreased and the current from the power harvesting system be increased.

Examples will now be described with reference to the figures where the device is a smart card and the terminal with which it communicates a card reader. The card could for example be a banking card, an ID card, a passport etc., and the card reader could be a point-of-sale (POS) terminal, a cash register, an ATM machine, a computer, a smartphone etc. This is for the purpose of illustration only, and it will be understood that each of the following examples could be implemented in any suitable device capable of performing contactless and/or contact communication with a terminal. The following examples could for example be implemented within a device adopting a form factor that is not a card, for example a fob, a dongle or a security token (e.g. a USB token). Alternatively, the following examples could be implemented within devices integrated into a communication device such as a mobile phone or smartphone; a wearable device, such as a bracelet, watch, a glove/pair of gloves, a pin (e.g. a brooch), a badge or some other contactless wearable device.

Each of the examples relates to a card that can communicate with the terminal by both physical contact (by operating in a contact mode of operation), and without direct physical contact (by operating in a contactless mode of operation). These cards are referred to as dual-interface cards because they have a physical contact interface (e.g. in the form of a contact element) and a contactless interface (e.g. in the form of a contactless front end). The cards may be configured to communicate with the terminals according to any suitable radio communication standard when operating in contactless mode, for example Near Field Communication (NFC). In each example, the card comprises an embedded chip to perform a first function associated with the card, and a separate module that operates to perform processes as part of a second function associated with the card. The second function may be performed entirely by the module, or both the chip and module may perform parts of the processing to perform the second function, i.e. the processing to perform the second function may be distributed across both the chip and the module.

The architectures illustrated in these figures could be implemented within cards incorporating a variety of different functions. For example, the primary function implemented by the chip could be banking functionality such as the performance of a financial transaction, e.g. making a purchase. Alternatively, the chip may operate to provide some other function associated with the card requiring communication with a terminal, for example: providing physical access of the card user to a region of an environment (e.g. building access); identifying or authenticating a user; retrieval of personal user information (e.g. medical information and records) etc. The chip may be configured to communicate with the card reader in accordance with the ISO14443 standard (when operating in contactless mode) and the ISO7816 standard, as well as the EMVCo® standard.

The second function may consist of processing steps that do not require communication with a terminal to be performed. However, the performance of the second function may be requested by the terminal. The second function may for example be a type of biometric authentication. The biometric authentication may authenticate a user of the device to enable the completion of the first function (e.g. performing a financial transaction). In other examples, the second function may be the capture of an image of part of a user (e.g., for the purposes of biometric authentication); or may be a type of biometric enrolment. Other example implementations will be described in more detail below.

Figure 1:
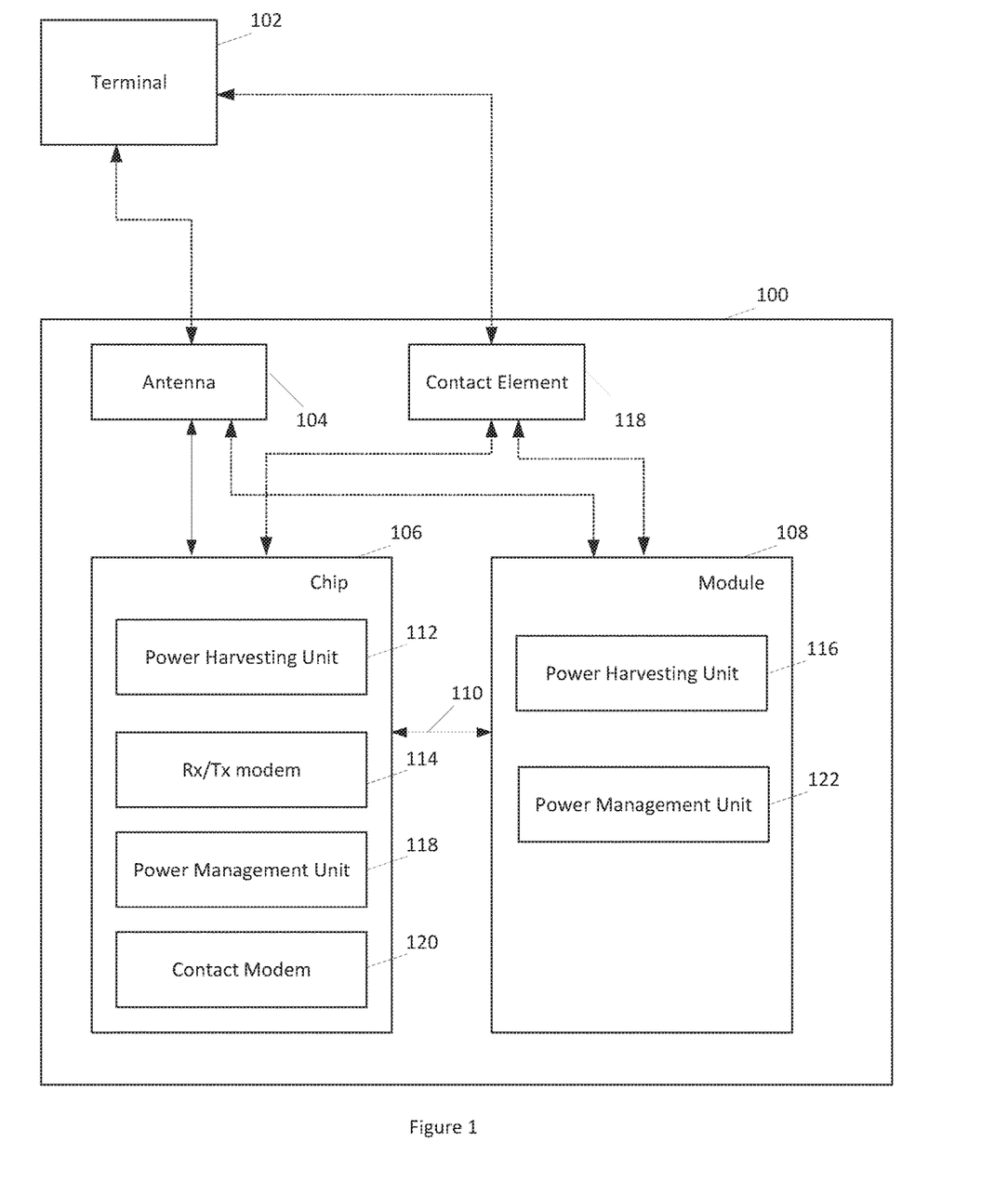
FIG. 1 shows a device capable of wireless communication with a terminal.

FIG. 1 shows an example device 100. Device 100 can communicate with terminal 102 through a contact or contactless interface. The device comprises an antenna 104, a chip 106, a module 108 and a contact element 118. The chip 106 is embedded within the device and could be, for example, a Secure Element. Module 108 may also be embedded within the device. In this example, the module is a physically distinct component from the chip 106; each of the chip 106 and module 108 may for example be implemented on respective integrated circuit chips embedded in the device. In other examples, the module 108 and chip 106 may be physically connected, but logically separate entities. The module 108 and chip 106 are connected to each other by one or more communication links, shown generally at 110. The links may physical links. Each of the links may for example be a bus.

Device 100 communicates with terminal 102 (e.g. transmit messages to and/or receive messages from the terminal) through the antenna 104 when operating in a contactless mode, and through the contact element 118 when operating in a contact mode. In general, the device 100 may comprise one or more contact elements; one contact element is shown here for the purpose of clarity.

The contact element 118 is connected to the chip 106. The chip may be connected to the contact element by a conductive link. The contact element enables the device to communicate with the terminal through direct physical contact when the device is operating in a contact mode of operation. The contact element also provides electrical connectivity to the terminal when the device and terminal and brought into suitable physical contact. Thus, when the device is operating in contact mode, the chip receives power from the terminal through the contact elements. The device may communicate with the terminal in accordance with the ISO7816 standard when operating in contact mode.

In some arrangements, the contact element may be connected only to the chip. In these arrangements, the chip receives power from the terminal through the contact elements. The chip may then manage that received power to power its internal components and supply power to the module to power its internal components. In the arrangement shown in FIG. 1, the contact elements are connected to both the chip 106 and the module 108. Thus, both the chip and the module can receive power from the terminal through the contact elements when the device is in contact mode.

The antenna 104 is connected to both the chip 106 and module 108, for example by physical links such as a conductive element. In other arrangements, only the chip may be connected to the antenna.

Data is exchanged between the chip 106 and terminal 102 through the antenna 104 when the device 100 is operating in a contactless mode. When operating in contactless mode, the chip communicates with the terminal 102 in accordance with a transmission protocol whereby a message, or command sent by the terminal to the chip 106 sets an initial specified waiting time for a response. Communication with the terminal 102 within the waiting time may be required to maintain a connection between the device 100 and terminal 102. Failure to respond to the terminal 102 within the specified waiting time may cause the connection between the device and terminal to be lost or reset. The waiting time may not be explicitly set by the protocol, but may be negotiated between the device 100 and terminal 102 in accordance with a formula specified by the protocol. The transmission protocol could for example be governed by the ISO14443 and/or the EMVCo® standard.

The chip 106 comprises a power harvesting unit 112, a transceiver modem 114, a power management unit 118 and a contact modem 120. These components may be interconnected by a bus.

The power harvesting unit 112 harvests power from the wireless signal emitted from the terminal received by the antenna 104 when the card is operating in contactless mode. The power-harvest unit 112 may for example induce a voltage from the received signal emitted by terminal 102. That induced voltage can be supplied to other components of the chip 106, and module 108. The wireless signal emitted from the terminal may be a radio-frequency signal governed by a radio communications standard. In one example, the wireless signal is an NFC signal.

The transceiver modem 114 manages the transmission of messages to and reception of messages from the terminal 102 when in contactless mode. The transceiver modem 114 may operate to manage the reception and transmission of those messages to comply with the standards governing the communication with the terminal. The modem 114 may also operate to extract data from a received wireless signal. The terminal 102 transfers data to the device 100 by modulating the signal it generates. The terminal may modulate the generated signal by means of amplitude modulation. The modem 114 may then extract data from the received wireless signal by demodulating amplitude variations of the voltage induced in the antenna caused by the amplitude modulation at the terminal 102.

The modem may transfer messages to the terminal by modulating data generated within the chip 106 onto the wireless signal emitted from the terminal 102. To do this, the modem 114 applies a modulated load to the antenna 104. Modulating the antenna load at the device 100 varies the power drawn from the received signal in accordance with the modulation. The variations in drawn power can be detected by the terminal 102 and interpreted as data.

The power management unit (PMU) 118 operates to manage, or control, the use of power (either harvested by the power-harvesting unit 112 in contactless mode or supplied through the contact element in contact mode) by components of the chip. The PMU 118 may control the power consumed by the other components of the chip to perform their tasks. In arrangements in which the module is not connected to the antenna 104 or contact elements 120, the PMU may also control the supply of harvested power from the chip 106 to the module 108.

The chip further comprises a contact modem 120 that manages the transmission of messages to and reception of messages from the terminal when operating in contact mode. The contact modem 120 may also ensure the communications between the chip and terminal satisfy any relevant standards (e.g. the ISO7816 standard) when the device operates in contact mode.

Module 108 comprises its own power-harvesting unit 116. The power-harvesting unit 116 is operable to harvest power from the signal received by the antenna 104 in contactless mode. Power harvested by unit 116 may be supplied to other components of the module 108 to power those components. By implementing this architecture, the module 108 can harvest power from the received signal independently of the chip 106, e.g. independently of the operation of the chip. Module 108 may also include its own power management unit (PMU) 122 to manage, or control, the consumption of power (either harvested by the power-harvesting unit 116 in contactless mode or supplied through the contact element in contact mode) by components of the module. The module's PMU 122 may control the power consumed by the other components of the module 108 during their operation to perform their tasks. The module may not include a power-harvesting unit and/or power management unit in implementations in which only the chip is connected to the antenna.

The module 108 is configured to perform one or more processing steps as part of implementing a second function associated with the device 100, and is not constrained to respond to the terminal 102 within any specified waiting time. The second function may not require communication with the terminal 102; thus, in some examples, the module 108 may not communicate directly with the terminal at all—that is, only the chip communicates with the terminal. In this example the module is a biometric sensor module including one or more biometric sensors. The biometric sensor module operates to perform biometric recognition or authentication of one or more biometric parameters including, for example: fingerprint recognition; iris recognition; vein recognition; retina recognition; voice recognition; behavioural recognition; facial recognition etc. It may also perform biometric enrolment.

Figure 2:
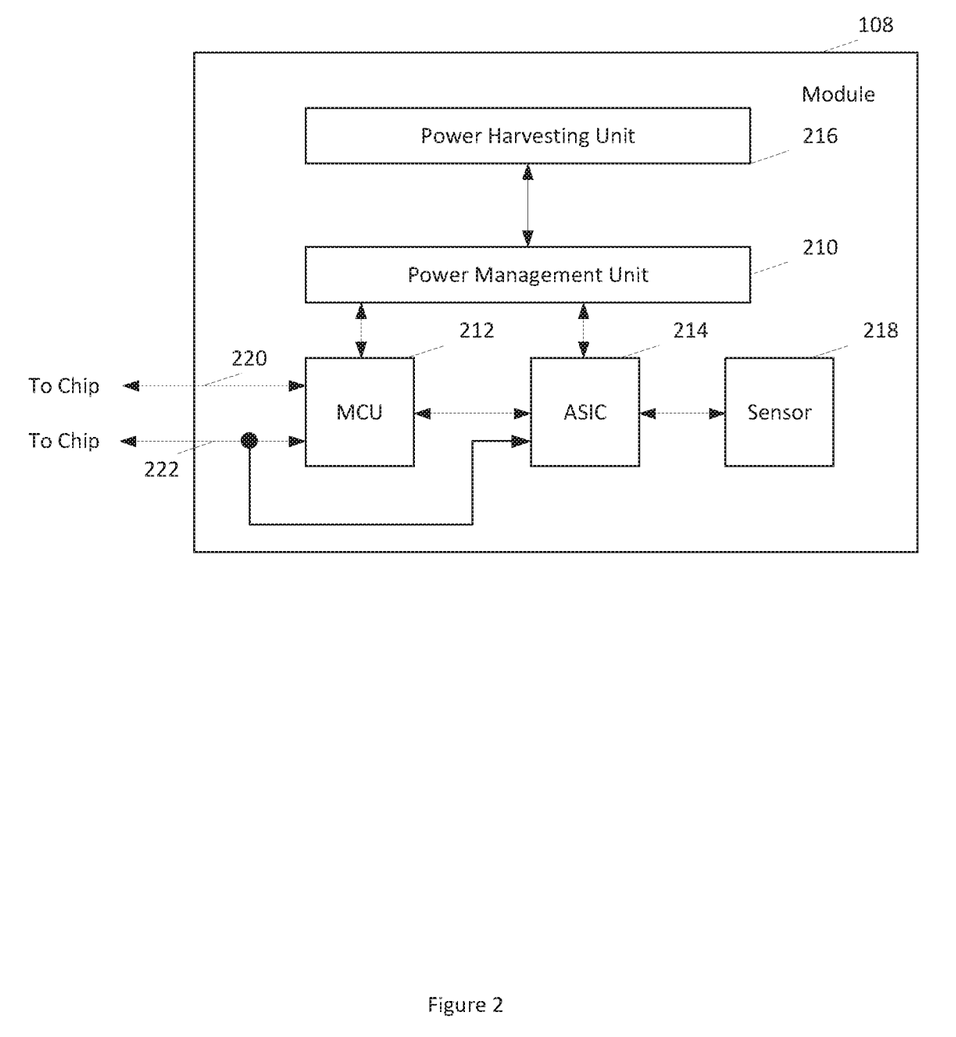
FIG. 2 shows a more detailed view of the module of the device shown in FIG. 1.

An example implementation of the module 108 as a biometric sensor module is shown in FIG. 2. The biometric sensor module operates to perform at least part of the second function of card 100, which in this example is biometrically identifying or authenticating a user of the card 100. The sensor module 108 comprises a power management unit 210, a master controller unit (MCU) 212, an application-specific integrated circuit (ASIC) 214, and a biometric sensor 218. In this example the sensor module 108 further comprises a power harvesting unit 216. The components of the sensor module 108 may be interconnected by a bus. Though MCU 212 and ASIC 214 are shown as separate physical components, in alternative arrangements they may be combined into a single unit. Also shown in FIG. 2 are two communication links 220 and 222 that interconnect the module 108 and the chip 106. Links 220 and 222 may be physically and/or logically separate links. Link 220 and/or link 222 may be a physical link. Link 220 and/or link 222 could be an I²C bus or a Serial Peripheral Interface (SPI) bus.

The power management unit 210 manages, or controls, the power (e.g. voltage) supplied to the components of the biometric sensor module 108. In this way, the power management unit 210 can control the power consumed by the other components of the sensor module. The power management unit 210 may be physically connected to each of the MCU 212, sensor 218 and ASIC 214. This allows the power management unit to control the power supplied to each of these components separately. The inclusion of the power management unit 210 within the sensor module 108 also enables the sensor module to control the power consumption of each of its internal components independently of the chip 106.

Sensor 218 is a biometric sensor for capturing one or more biometric parameters of the user. In some examples, the sensor may capture the biometric parameters by capturing images of a biometric source. Sensor 218 could be, for example, a fingerprint sensor (a single or double-sided sensor) for capturing fingerprint images, a retina sensor for capturing retina images, an iris sensor for capturing iris images, a vein pattern sensor for capturing images of vein patterns, a facial sensor for capturing facial images etc.

The ASIC 214 controls the operation of the sensor 218. The ASIC may for example instruct the sensor to enter an acquisition mode in which the sensor captures data for a biometric parameter (e.g. a fingerprint pattern, retina pattern, iris pattern etc.). The ASIC may also receive data (e.g. image data) captured by the sensor 218 (e.g. during acquisition mode). The ASIC may communicate the captured biometric data to the MCU 212. The ASIC may also control the operating state of the sensor, for example by controlling when the sensor transitions between a low-power standby mode and the higher power acquisition mode.

The MCU 212 may perform biometric matching to compare data for a biometric parameter captured by the sensor 218 to stored template data. For example, if the data captured by the sensor is an image, the MCU may perform image processing to determine whether the image captured by the sensor 218 matches a stored template image. A template image is a trusted image. An image may be trusted in the sense it is taken to be of a biometric source belonging to the user of the card 100. To perform the image processing, the MCU may perform feature extraction on the captured image to identify a set of one or more extracted features. The extracted features are then compared with the features of the template image to determine if the captured image matches the template image. The MCU may for example compare the features of the images to determine a matcher score for the captured image. The captured image may be taken to match the template image if the matcher score is above a predetermined threshold.

The MCU may communicate an indication that the captured biometric parameter data matches the template data to the chip 106. The chip 106 can then communicate an indication that the user of the card has been authenticated back to the reader 102. The authentication of the card user may enable the primary function associated with the card 100 to be completed. Alternatively, the MCU may communicate to the secure element 106 that the captured biometric parameter data does not match the template data, in which case the user of the card has not been authenticated and primary function associated with the card 100 may not proceed, or may proceed in an altered fashion as a consequence of there being no match. This is an example of an implementation in which each stage, or process, of the biometric authentication is performed by the module 108.

In an alternative implementation, the process of performing the image matching may be performed by the chip 106, rather than by the module 108. This is an example of an implementation in which the processes of biometric authentication are performed by both the chip 106 and the module 108; i.e. the biometric authentication is not performed solely by the module 108.

The MCU 212 may also be configured to control the operative state of the ASIC 214. For example, the MCU may control the transition of the ASIC between a low-powered standby mode and a high-powered active mode.

Module 108 has a digital and analogue architectural split. That is, the module 108 includes circuitry (e.g. components), that operates in the analogue domain and circuitry (e.g. components) that operates in the digital domain. That is, the module 108 may include an analogue region (formed of the circuitry that operates in the analogue domain) and a digital region (formed of the circuitry that operates in the digital domain). For example, sensor 218 may operate in the analogue domain because the data captured by the sensor of the biometric parameter may be analogue data. Components of the ASIC 214 may also operate in the analogue domain. For example, the ASIC 214 may include an analogue front-end (AFE) that operates to receive the captured data from sensor 218 and perform processing on that data to generate processed data that is provided to other components of the module, for example the MCU 212. In other words, the AFE operates to interface the sensor 218 with other components of the module 108. The processing performed by the AFE may include analogue signal conditioning. The AFE may output a conditioned analogue signal to an analogue-to-digital converter (ADC) within the ASIC 214, or alternatively the ADC may form part of the AFE, in which case the AFE operates to output a digital signal indicative of the sensor data received from sensor 218.

The ASIC 214 might also include components that operate in the digital domain. For example, the ASIC 214 might include components that operate to communicate the digitised biometric data from the sensor 218 to other components of the module, for example to the MCU 212 for image matching. Further components of the module that operate in the digital domain include the MCU 212. That is, the image processing performed by the MCU 212 may be performed in the digital domain, for example using digital logic circuitry.

Thus, in summary, the module 108 includes components that operate in the analogue domain and components that operate in the digital domain. Both the analogue and the digital components may be used to perform the processing steps performed by the module to implement at least part of the second function associated with the device 100.

The module 108 further comprises voltage-regulator circuitry that is configured to generate regulated supply voltages for the components of the module from the energy harvested by the power harvesting unit. A regulated voltage is one that is maintained at an approximately constant level given variations in the primary input voltage and load current.

Figure 3:
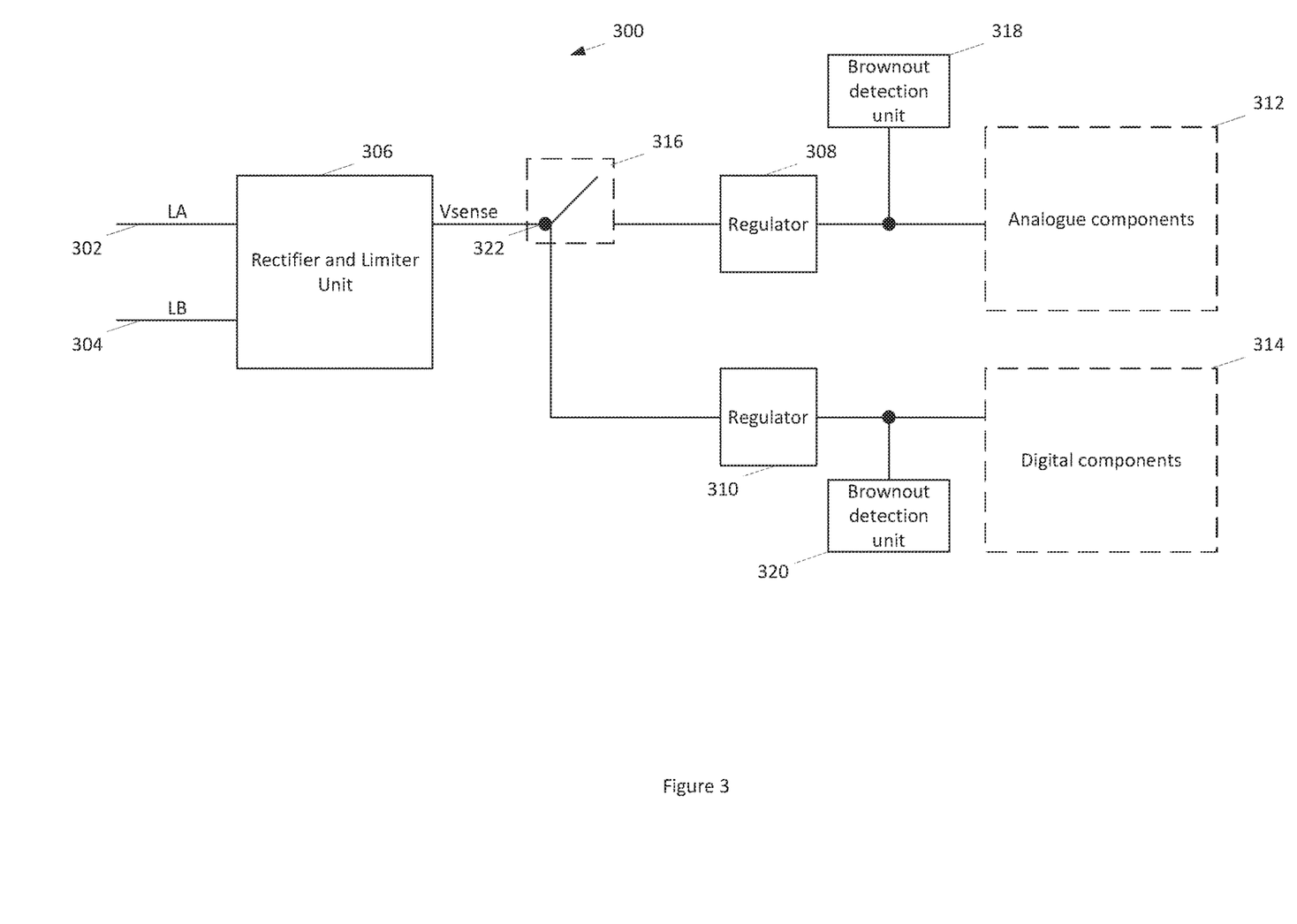
FIG. 3 shows an example of regulator circuitry for outputting regulated voltages to analogue and digital components of the module.

Example voltage-regulator circuitry 300 is shown in FIG. 3. The circuitry 300 comprises inputs 302 and 304 coupled to the device's antenna 104 that provide an induced voltage by the antenna to a rectifier and limiter unit 306. Inputs 302 and 304 may form part of the power harvesting unit 216. The rectifier and limiter unit 306 is configured to rectify the voltage induced by the antenna. The unit 306 may further be configured to limit the voltage (i.e. so that the voltage is below a specified threshold of the unit 306). Thus, the unit 306 is configured to generate and output a rectified and limited voltage from the voltage induced by the antenna 104. That voltage is denoted Vsense.

The circuitry 300 further comprises two voltage regulators 308 and 310. The regulators are arranged in parallel, i.e. both regulators 308 and 310 have inputs connectable to a common node 322. The first regulator 308 is also coupled to analogue components of the module 108 (denoted at 312) and the second regulator 310 is coupled to digital components of the module 108 (denoted at 314). The analogue components of the module 312 operate in the analogue domain and the digital components of the module 314 operate in the digital domain. The analogue components 312 might include for example the sensor 218 and/or the portion of the ASIC 214 that operates in the analogue domain (e.g. its analogue front end). The digital components 314 might include the controller unit 212 and/or the portion of the ASIC that operates in the digital domain.

Put another way, the circuitry 300 comprises a first branch and a second branch each connectable to common node 322 that is coupled to the rectifier and limiter unit 306. The first branch is coupled to the first voltage regulator 308 that is coupled to analogue components of the module, and the second branch is coupled to the second voltage regulator 310 that is coupled to digital components of the module.

The regulator 308 is arranged to output a first regulated voltage to the analogue components 312 and the regulator 310 is configured to output a second regulated voltage to the digital components 314. The second regulated voltage is lower than the first regulated voltage. This is based on an appreciation by the inventors that analogue and digital components can operate with different voltage supplies, with analogue components generally requiring a higher voltage supply than digital components. The analogue voltage supply may refer to the voltage level to be supplied to the analogue components to enable those components to operate in a normal working order. The analogue voltage supply may therefore be some threshold value, which might be referred to herein as the analogue supply threshold value. The digital voltage supply may refer to the voltage level to be supplied to the digital components to enable those components to operate in a normal working order. The digital voltage supply may therefore also be some threshold value, which might be referred to herein as the digital supply threshold value. The values of the first and second regulated voltages may vary by implementation.

The first and second branches of the circuitry 300 may each further comprise brownout detection units 318 and 320 respectively. Unit 318 operates to detect brownout of the voltage supplied by regulator 308 and unit 320 operates to detect brownout of the voltage supplied by regulator 310. In the example shown, unit 318 is located between the output of regulator 308 and the analogue components 312, and unit 320 is located between the regulator 310 and the digital components 314. In other examples, the brownout detection units might be placed elsewhere on the first and second branches. For example, detection unit 318 might be placed, or located at the input of regulator 308, and detection unit 320 might be placed, or located at the input of regulator 310.

The circuitry 300 further comprises circuitry in the form of a switching element 316. The switching element is operable to selectively couple the first regulator 308 to the rectifier and limiter unit 306 (and hence also the antenna 104). The switching element 316 is moveable between a first configuration (e.g. closed position) in which the input of regulator 308 is electrically coupled to the antenna (e.g. via the power-harvesting unit 216), and a second configuration (e.g. open position) in which the input of regulator 308 is electrically disconnected from the antenna 104 and power-harvesting unit 216. In this example, the input of the regulator 310 is electrically coupled to the antenna 104 via power-harvesting unit 216 independently of the configuration of the switching element 316. Put another way, the inputs of regulator 308 and 310 are both connected to the common node 322 when the switch is in its first configuration, and only the input of the regulator 310 is connected to the common node 322 when the switching element 316 is in its second configuration. It follows that the analogue components 312 are electrically disconnected from the power-harvesting unit 216 and antenna 104 (i.e. are disabled) when the switching element is in the second configuration and are electrically coupled to the power-harvesting unit 216 and antenna 104 when the switching element 316 is in the first configuration.

The circuitry 300 may be implemented within the module 108 in a number of different ways. For example, the rectifier and limiter unit 306, the switching element 316 and the regulators 308 and 310 might form part of the power management unit 210. In this way, the power management unit 210 can operate to output first and/or second regulated voltages depending on the configuration of the switching element 316. In an alternative arrangement, the switching element 316 and the regulators 308 and 310 might form part of the power management unit 210 and the rectifier and limiter unit 306 might form part of the power-harvesting unit 216. In further alternative arrangement, both the rectifier and limiter unit 306 and the switching element 316 might form part of the power harvesting unit 216, and the regulators 308 and 310 might form part of the power management unit 210.

Voltage regulator circuitry 300 facilitates two operational modes of the module 108: a first mode in which the switching element 316 is in its first configuration and a second mode in which the switching element 316 is in its second configuration. The module 108 operates in the first mode when the analogue components 312 are active (e.g. when the module 108 is performing analogue processing or a combination of analogue and digital processing) and operates in the second mode when only digital components 314 are active (e.g. when the module 108 is performing only digital processing). The operational mode of the module 108 may be controlled by a component of the module 108, such as the controller unit 212 or the power management unit 210. This component may control the operational mode of the module 108 in dependence on the processing performed by the module. That is, the component may set the operational mode of the module 108 based on the processing performed by the module.

For example, during periods in which analogue processing is to be performed, the component causes the module 108 to operate in the first operational mode by causing switching element 316 to adopt its first configuration. During periods in which only digital processing is to be performed by the module, the component causes the module 108 to operate in the second operational mode by causing switching element 316 to adopt its second configuration. Further examples of this will be described below.

The provision of parallel regulators 310 and 312 and the switching element 316 therefore enables the higher analogue supply domain to be turned off during periods in which the processing performed by the module 108 is only within the digital domain (i.e., during periods in which only the digital components are active). This enables the supply voltage to the regulators, Vsense, to be reduced during periods when only digital processing is being performed. For example, during periods in which the analogue components are active (e.g. when analogue processing is being performed by the module 108) Vsense is preferably equal to or above a first voltage threshold equal to the analogue supply voltage plus the voltage drop over regulator 308. This first voltage threshold may vary by implementation but in some examples might be 2.2V, for example. However, during periods in which the analogue components are inactive and only digital processing is being performed by the module (i.e. only digital components 314 are active), Vsense can be reduced to be equal to or above a second voltage threshold equal to the digital supply voltage (which is typically less than the analogue supply voltage) plus the voltage drop over regulator 310. The value of this second voltage threshold might also vary by implementation but in some examples might be equal to 1.2V. In a power harvesting system such as that shown in FIGS. 1 and 2, the maximum current drawn from the antenna 104 can be estimated from the minimum permissible value of Vsense and the antenna's impedance. Thus, reducing the value of Vsense conveniently enables the current drawn from the antenna 104 to be increased when the module 108 is operating in the second operational mode.

The value of Vsense might be controlled by the same element of the module 108 that controls the configuration of the switching element 316 (e.g. the MCU 212 or the power management unit 210). Thus, the element might be configured to cause the module 108 to operate in the first operational mode by: (i) outputting a signal to the rectifier and limiter unit 306 to cause the unit to output a regulated voltage equal to or above the first voltage threshold; and (ii) outputting a signal to the switching element 316 to cause the switching element to adopt its first configuration; and cause the module to operate in the second mode by: (i) outputting a signal to the rectifier and limiter unit 306 to cause the unit to output a regulated voltage equal to or above the second voltage threshold; and (ii) outputting a signal to the switching element 316 to cause the switching element to adopt its second configuration.

The circuit arrangement shown in FIG. 3 also enables brownout detection to only be implemented in active domains. Thus, brownout detection can be disabled for domains that are not active. In other words, brownout detection unit 318 can be disabled (i.e. disconnected) when the switching element 316 is in its second configuration. In this way, the brownout detection unit 318 operates to perform brownout detection only when the switching element 316 is in its first configuration. This means brownout detection for the analogue components 312 can be disabled when the analogue components are electrically disconnected from the antenna 104. Limiting brownout detection only to components of the module that are active conveniently reduces the amount of active circuitry within the module when analogue processing is not being performed, which can reduce power consumption of the module.

The steps performed when device 100 communicates with terminal 102 will now be described.

As a high level summary, the steps involved in having device 100 respond to an authentication request from terminal 102 may be as follows:

1. A user attempts to implement the first function associated with the device, for example undertake a transaction with a certain identity or gain access to a region of an environment.
2. The device 100 is placed within range of the terminal 102. Typically, the operating range will be 10 cm or less, and often 4 cm or less. The device 100 may be kept within range of the terminal 102 during the succeeding steps.
3. The terminal 102 transmits a wireless signal comprising an authentication request. The authentication request signal may include data indicating the purported identity of the user and/or other data such as a PIN entered by the user. The signal may be in accordance with the ISO/IEC 14443 protocol.
4. The transmitted signal is received by the device 100. The chip 106 harvests power from the signal and boots up. The chip reads the authentication request, and identifies that it needs biometric authentication in order to respond. The authentication request may be in accordance with the EMVCo® protocol.
5. The chip 106 signals the module 108 to activate it.
6. The module 108 begins harvesting power from the signal transmitted by the card terminal via power-harvesting unit 116, and continues to do so whilst it is performing biometric authentication. The module 108 boots up.
7. The sensor 218 acquires biometric data, e.g. fingerprint data.
8. The acquired biometric data is transferred to a component of the device 100 that is to process it, such ASIC 214 and/or MCU 212.
9. The device component (e.g. the MCU 212) analyses the acquired biometric data to characterise it to a form suitable for comparison with stored reference data. This may involve pre-processing the biometric data and extracting features from the biometric data. Alternatively, feature extraction could be performed elsewhere: for example on the ASIC 214 or the chip 106.
10. The characterised acquired biometric data is compared with stored reference data. The comparison could be performed in the module 108 (e.g. in the MCU 212) or the chip 106. The stored reference data may be known as a template. Conveniently the template is stored in or locally to the unit that performs the comparison. The stored reference data represents the appropriate biometric data of the genuine user of the card. This comparison generates a result, which may be a successful match or a failure to match.
11. Having analysed the acquired biometric data, the device component (e.g. the MCU 212) returns the result to the chip 106. The result is communicated as an encrypted message over data link 220.
12. The chip 106 generates a response to the authentication request and causes the response to be transmitted by the device's antenna 104. The response indicates whether biometric authentication was successful. The response may be in accordance with the EMVCo® protocol.
13. The terminal 102 receives the response and grants or denies the transaction requested by the user in dependence on whether the response indicates that authentication was successful.

In addition to the biometric authentication, the chip 106 may perform authentication steps, for example by verifying a PIN or responding to a challenge sent by the terminal.

In a variation of the above summary, the module 108 begins harvesting power as soon as the device 100 is placed within communication range of the terminal 102. That is, the module 108 begins harvesting power automatically when the device 100 is within the contactless field of the terminal 102 without requiring an activation signal from the chip 106. Thus, in this variation, step 5 is omitted.

In the above summary, each of steps 7 to 11 is an example of a processing step performed by the module 108 to implement the function of biometric authentication performed by device 100.

Figure 4:
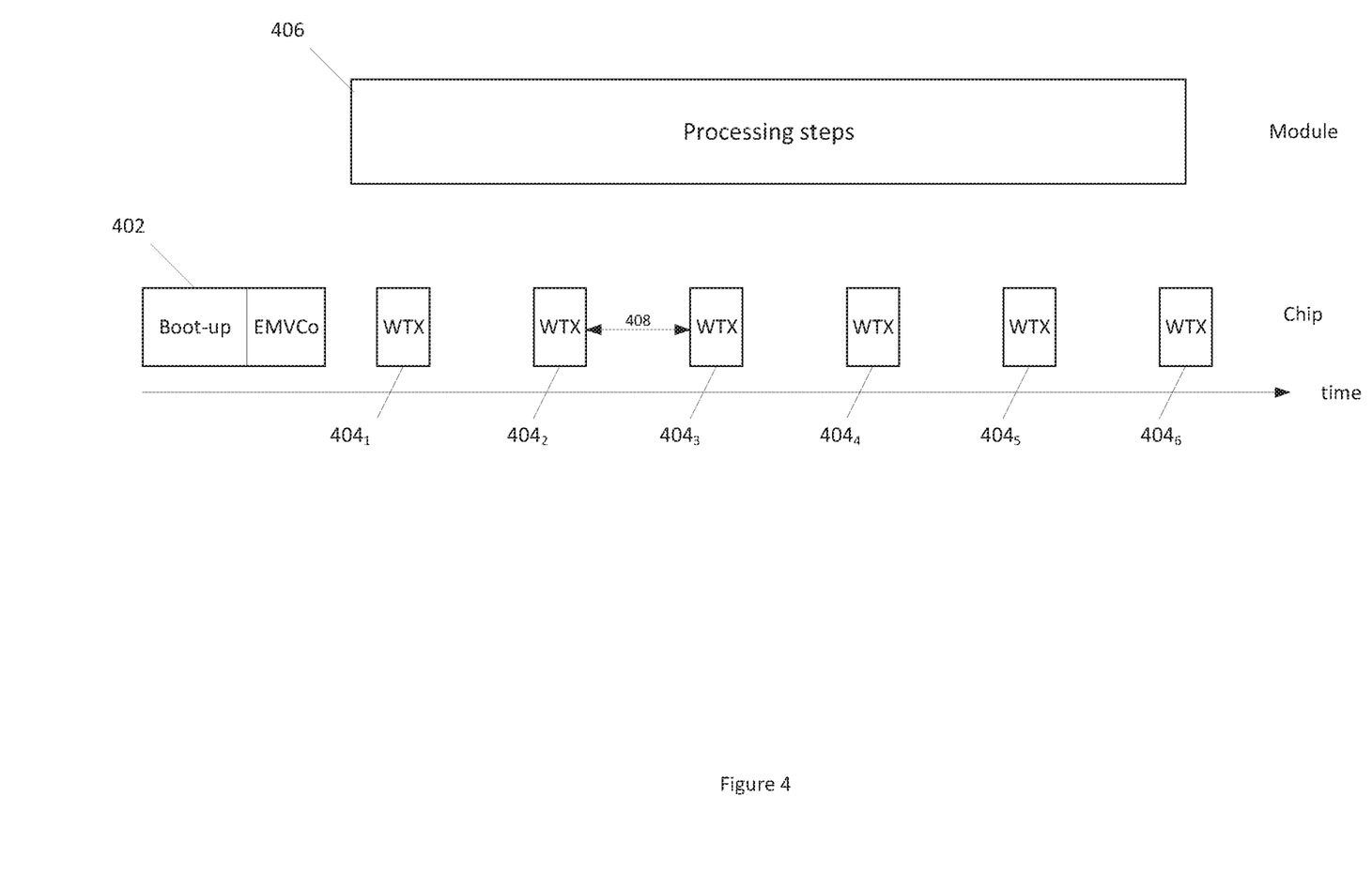
FIG. 4 shows a timing diagram of the execution of processing steps by the module and communications between the device and terminal.

FIG. 4 is a schematic timing diagram illustrating the operation of the module 108 and the chip 106 when performing the steps 1 to 13.

When device 100 is operating in the contactless mode of operation, chip 106 communicates with the terminal 102 in accordance with the ISO14443 and EMVCo® standards. These standards specify that the terminal 102, having sent a command (e.g. the authentication request) to the chip 106, sets an initial waiting time (known as the frame waiting time (FWT)) for a response from the chip. The FWT is the maximum amount of time permitted for the chip to initiate sending a response back to the terminal. Failure by the chip to send a response to the terminal within the FWT may result in the communication connection between chip and terminal being lost, for example timed out. The value of the FWT can be negotiated between the device 100 and the terminal 102. The chip 106 can communicate a waiting time extension request to the terminal 102. The waiting time extension request may be denoted S(WTX). In response to receiving the waiting time extension request, the terminal extends the waiting time for a response from the chip. The device may extend the waiting time by the frame waiting time FWT (i.e., it may extend the waiting time by an amount equal to the initial waiting time). A waiting time extension request may be made at any time before the expiry of the current waiting time.

The timing restrictions imposed by the ISO14443 and EMVCo® standards are illustrated schematically in FIG. 4. Block 402 denotes the boot-up of the chip 106 and module 108 and communication with the terminal in accordance with the EMVCo® standard (steps 4 to 6). The series of waiting time extension requests communicated from the chip to the terminal 102 are denoted $404_{1-6}$. The time period in which the terminal expects a response from the chip 106 may be referred to as a waiting time interval. The waiting time interval is the time period between successive communications between the device 100 and terminal 102 imposed by timing restrictions of the standard governing those communications. The waiting time interval is a time period in which a communication (e.g. a response to the command issued by the terminal 102, or a waiting time extension request) is to be sent from the chip to the terminal 102 to maintain the communication connection. The waiting time interval may therefore be the time period between the time the command was received from the terminal and the initial specified waiting time, or the time period between making a waiting time extension request and the new extended waiting time resulting from that request. That is, the waiting time interval may be viewed as the time period between two scheduled communications between the chip and the terminal. In this example, the waiting time interval is equal to the frame waiting time FWT. An example waiting time interval is shown at 408.

A set of processing steps (e.g. steps 7 to 11) to be performed by the module 108 are illustrated in FIG. 4 by block 406. As shown, the time required by the module to perform the processing steps may exceed the waiting time interval. In some cases, it is possible for the duration of the processing steps to span several waiting time intervals.

It is desirable for the module 108 not to perform its processing during the time periods the chip is communicating with the terminal 102. This is for two main reasons. Firstly, when the device is operating in a contactless mode of operation, the power that can be harvested from the received signal emitted from the terminal may be limited. The power that can be harvested is prioritised to support the scheduled communications with the terminal 102 necessitated by the standards the device 100 is operating in compliance with. Secondly, power drawn by the module 108 during periods the chip is communicating with the terminal affects the load modulation of the signal emitted by the terminal, which can appear as extra noise to the terminal. In other words, power drawn by the module may cause interference in the communications between the chip and terminal.

To avoid these problems, the processing steps 406 performed by the module 108 are further partitioned into a plurality of discrete operations, or tasks. Each task may take a reduced amount of time to complete than the processing step of which it forms part. Processing performed by the module 108 can be started or paused on the boundaries between discrete operations. In other words, processing performed by the module may be paused upon completion of a discrete task and resumed by processing a subsequent discrete task. It is possible for the processing steps 306 performed by the module to be partitioned into discrete tasks with varying degrees of granularity. For example, a discrete operation may refer to one of the processing steps described above (e.g. image acquisition). Alternatively, a discrete operation may be a combination of processing steps, or part of a processing step (e.g., each processing step may be formed of a plurality of discrete operations).

The device 100 may then operate to synchronise the processing of these discrete tasks with the scheduled communications between the device 100 and terminal 102 (which in this example, are the waiting time extension requests S(WTX)). The device performs this synchronisation so that the discrete tasks are performed within the waiting time intervals and are not performed during the periods the device 100 is communicating with the terminal 102. That is, the discrete tasks are performed in the time intervals between the scheduled communications between the device 100 and terminal 102.

Figure 5:
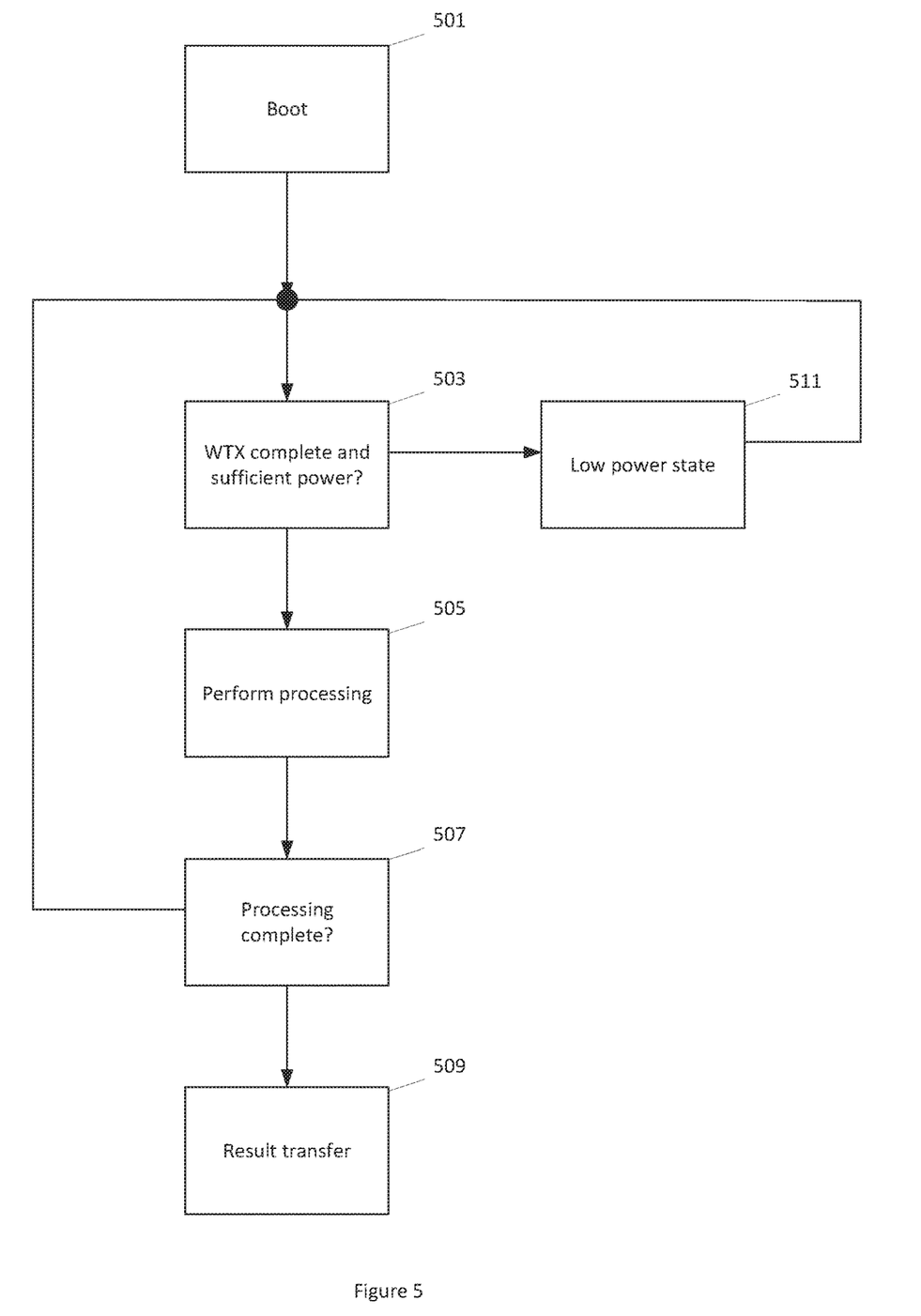
FIG. 5 shows a flowchart of steps performed by the module to perform one or more discrete operations within the time interval between successive communications between the device and terminal.

FIG. 5 shows how the module 108 may operate to perform its processing as part of the performing the second function of device 100, which in this example is biometric authentication. The module 108 operates so as to be compatible with a protocol in which a session can time out after a predefined period (the 'waiting time interval'), but that period can be extended by transmission of an extension message. At step 501, the module 108 is booted up, for example in response to a request from the chip 106. This corresponds to step 6 of the process described above. The module 108 may then verify that the power management state of the module is such that its biometric processing can proceed. This involves verifying that sufficient power is available to complete a set of one or more discrete tasks. The discrete tasks might be a set of one or more tasks scheduled for processing. This could be implemented by step 503, or at least part of it, being implemented immediately after boot. When the device 100 is being powered in a contactless manner, the amount of power available will depend on how much energy is being harvested from the antenna 104. If that is verified successfully, or if no verification is done at that stage, then the process proceeds to step 505 where the discrete task(s) is/are performed. The module 108 may optionally perform a check prior to step 505 of whether an object is physically present at the sensor 218. This avoids use of power to attempt to detect the biometric source (e.g. fingerprint) when it isn't present at the sensor. Then at step 507 the module, having completed its discrete task(s), assesses whether biometric processing is complete. If not, the algorithm passes to step 503. At step 503 the module (i) verifies that an S(WTX) command has been transmitted by the antenna 104 to the terminal 102 and (ii) verifies that sufficient power is available to complete one or more discrete tasks of processing. If it is determined at step 503 that there is insufficient power to perform one or more discrete tasks, then the module's components (e.g. the ASIC 214 and/or MCU 212) enter into a low power state. If it is determined at step 507 that processing is complete, then at step 509 the result of that processing (e.g. whether the user is biometrically authenticated or not) is returned to the chip 106.

As mentioned above, the device 100 operates to synchronise the processing of the discrete tasks at (step 505) with communications with the terminal 102 so that the processing of the tasks occurs in the time period between successive communications with the terminal 102 (e.g. within time interval 408 shown in FIG. 4). Each discrete task except for the last may therefore be defined so that it ends in the generation of an interim result or component state. That state can be stored, e.g. in a memory within the module 108 or other storage accessible to the module. Then processing by the module can be suspended and, optionally, the module's components placed in a low power mode. Since the interim result or state has been stored, the processing can be resumed at a later stage by re-configuring the module 108 with the stored result or state.

The set of one of or more discrete tasks identified at step 503 for processing at step 505 may conveniently be selected so that they take the module 108 less than the timeout interval of the communications protocol with the terminal to complete. Then the module 108 can resume safely to a standby state when the set of tasks is complete, without it being interrupted by the chip 106 needing to send an S(WTX) message. The discrete tasks start/resume when the module determines that there is sufficient power to carry them out and that there is sufficient time for each task in a scheduled set to complete without disrupting the scheduled transmissions between the device 100 and terminal 102 mandated by the communications protocol in use between them (step 503). Alternatively, the module 108 may select a set of one or more discrete tasks at step 503 and at step 505 process those discrete tasks until an interrupt signal is received from the chip 106. The chip 106 may communicate the interrupt signal to the module 108 a set time interval before the end of the timeout interval. In response to receiving the interrupt signal, the module 108 concludes the processing of the discrete task being processed and determines whether the biometric processing is complete (step 507). If processing is not complete (i.e. one or more discrete tasks remain to be processed) then the algorithm returns to step 503.

The scheduling of discrete tasks to be performed within a waiting time interval at step 503 may be performed by the MCU 212 or the power management unit 210. The set of one or more discrete tasks to be performed within a waiting time interval may be selected in dependence on the available power. Examples of this will now be described.

Each discrete task involves using one or more components of the module 108. The amount of power required by each of those components to perform that task may be determined in advance and stored, e.g. in the MCU 212 or in power management unit 210. The power requirements could be stored in a look-up table. To determine if there is sufficient power to carry out any discrete task, the power requirements for the elements required to be involved in implementing that task are summed. The total power requirement for that task can then be compared with the available power. If the available power is insufficient to allow the task to be completed then the module 108 can enter the low power state 511 and wait until sufficient power is available. It may continue to check for available power whilst it is enabled for processing, or it may wait until it is next enabled for processing after an S(WTX) message has next been sent. Otherwise it can begin performing the task(s).

In practice, there may be a wide span of power requirements amongst the various tasks. For example, tasks concerning image acquisition, image processing and image matching typically require significantly more power than communicating a signal between the chip 106 and the module 108, or transmitting a S(WTX) message. Depending on the chosen functional architecture, some tasks may require an ASIC and a biometric MCU to be active, while others may require only a biometric MCU to be active and still others may require only the chip 106 to be active. Therefore, it is possible that some operations can be carried out when the level of available power is low, but other operations cannot.

In one approach, available power is measured and compared to the respective power budget for the set of one or more tasks to be carried out and a binary decision is made as to whether the power is sufficient to perform the tasks, as described above with reference to step 503.

In another approach, power thresholds are defined to distinguish power levels where particular tasks are possible. There may, for example be two thresholds chosen, but a single threshold or more than two thresholds could be defined. In the two-threshold case if the available power is below a threshold 1, there is deemed to be insufficient power to carry out processing tasks. Then all processing components of the module 108 (e.g. an ASIC and an MCU) can be maintained in a low-power mode to reduce consumption. If the available power is above threshold 1 but below a threshold 2, there may be enough power to operate one or more components of the biometric element (e.g. the MCU) but not one or more others (e.g. the ASIC). Then the system may proceed with only tasks that require the components that require less power than defined by threshold 2. If the available power is above threshold 2 then there is enough power to drive all components of the module (e.g. both the ASIC and the MCU). When the available power is above threshold 2, any task that requires either or both of these elements can be proceeded with.

Tasks may be prioritised that best fit the available power level. For example, if the power is measured as being at a first level and there are tasks that need to be carried out that require more than that level of power and tasks that need to be carried out that require less than that level of power then the module could select the lower power tasks for execution. To permit this, the set of tasks to be performed for biometric processing could be arranged so that they can be performed in any order provided the result(s) required by a task are already available. For example, in some architectures, when a fingerprint is being read from a fingerprint sensor the data from the sensor may be read and stored in a memory, which may require a relatively low level of power, and that data may then be processed by an ASIC, which may require a relatively high level of power. When sufficient power is available to run the ASIC, and there is unprocessed data available in the memory then the ASIC could be operated. When there is insufficient power to run the ASIC but sufficient power to read data from the sensor and store it in memory then data could be read from the sensor. In this way, the tasks can be scheduled to make efficient use of available power.

A check for available power can be made on a periodic basis, or between discrete tasks or sets of discrete tasks. An example would be to check that, on ending an image acquisition task, power remains sufficient to start an image transfer task. If power permits, processing continues as originally scheduled but if the power drops below the necessary threshold, the scheduled operations can be halted and either the biometric element can enter a suspend state or different operations can be scheduled.

A further input into the decision as to whether power is sufficient to perform a set of one or more discrete tasks within a waiting time interval may be pre-stored information regarding the respective power requirements of the digital and analogue components of the module 108. This information might be stored in memory within the module 108, or otherwise be accessible to the module 108. The available power harvested by the power-harvesting unit 216 may be compared to the stored power requirements of the digital and analogue components of the module 108. Processing tasks may be selected for processing in dependence on that comparison.

For example, if the available power is determined to be above the power requirements of one or more digital components of the module 108, but below the power requirements of the analogue components, one or more processing tasks performed by digital components of the module may be selected for processing. If a set of one or more digital processing tasks are selected for processing within a waiting time interval, the switching element 316 of the circuitry 300 may be controlled to adopt its second configuration as described above to cause the analogue components 312 of the module to be deactivated. A signal may also be communicated to the rectifier and limiter unit 306 to cause the supply voltage Vsense to be reduced to be above a value equal to the digital supply voltage plus the drop over regulator 310. This enables the current drawn from antenna 104 to be increased as described above. The signals to control the unit 306 and switching element 316 may be output by the same element that performs the comparison of the available power with the power requirements of the digital and analogue components of the circuitry (e.g. the MCU 212 or the power management unit 210).

If on the other hand the available power is determined to be above the power requirements of one or more digital components and one or more analogue components of the module, processing tasks performed by digital and/or analogue components might be selected for processing. In this case the switching element 306 is controlled to adopt its first configuration to cause both the analogue and digital components of the module to be activated. A signal may also be communicated to the rectifier and limiter unit 306 to cause the supply voltage Vsense to be to be maintained above a value equal to the analogue supply voltage plus the drop over regulator 308.

Circuitry has been described herein for outputting different regulated voltages generated from an induced voltage at the antenna to digital and analogue components of the device module. The circuitry enables the analogue components of the module to be disconnected from the antenna and power-harvesting unit for periods in which only digital processing is to be performed by the module, and coupled to the power-harvesting unit and antenna for periods in which analogue processing is to be performed. Such a period may be a specified block of time in which it is determined that only digital processing is to be performed/that analogue processing will be performed, for example a waiting time interval (or timeout interval) between successive communications between the device and terminal. By disconnecting the analogue components of the module when no analogue processing is to be performed, the input supply voltage can conveniently be reduced compared to when analogue processing is to be performed, enabling a higher current to be drawn from the device's antenna and supplied to the active digital components. This can be beneficial because it has been appreciated that the processing speed of digital components (e.g. the MCU 212) is a function of supplied current. Thus, by increasing the current supplied to the digital components, the processing speed of these components can be increased. Alternatively, at times when the analogue components are disconnected from the antenna and power harvesting unit, the reduced input supply voltage can be used to reduce the clock speed during the digital processing to match the available power. That is, at times when the analogue components of the module are disconnected, the module 108 can reduce the clock speed of the digital components when the available power is relatively low, and increase the clock speed of the digital components when the available power is relatively high. The module 108 can therefore control the clock speed of the digital components during digital processing as a function of the available power. The clock speed may be controlled by the power management unit 210 or MCU 212.

Figure 6:
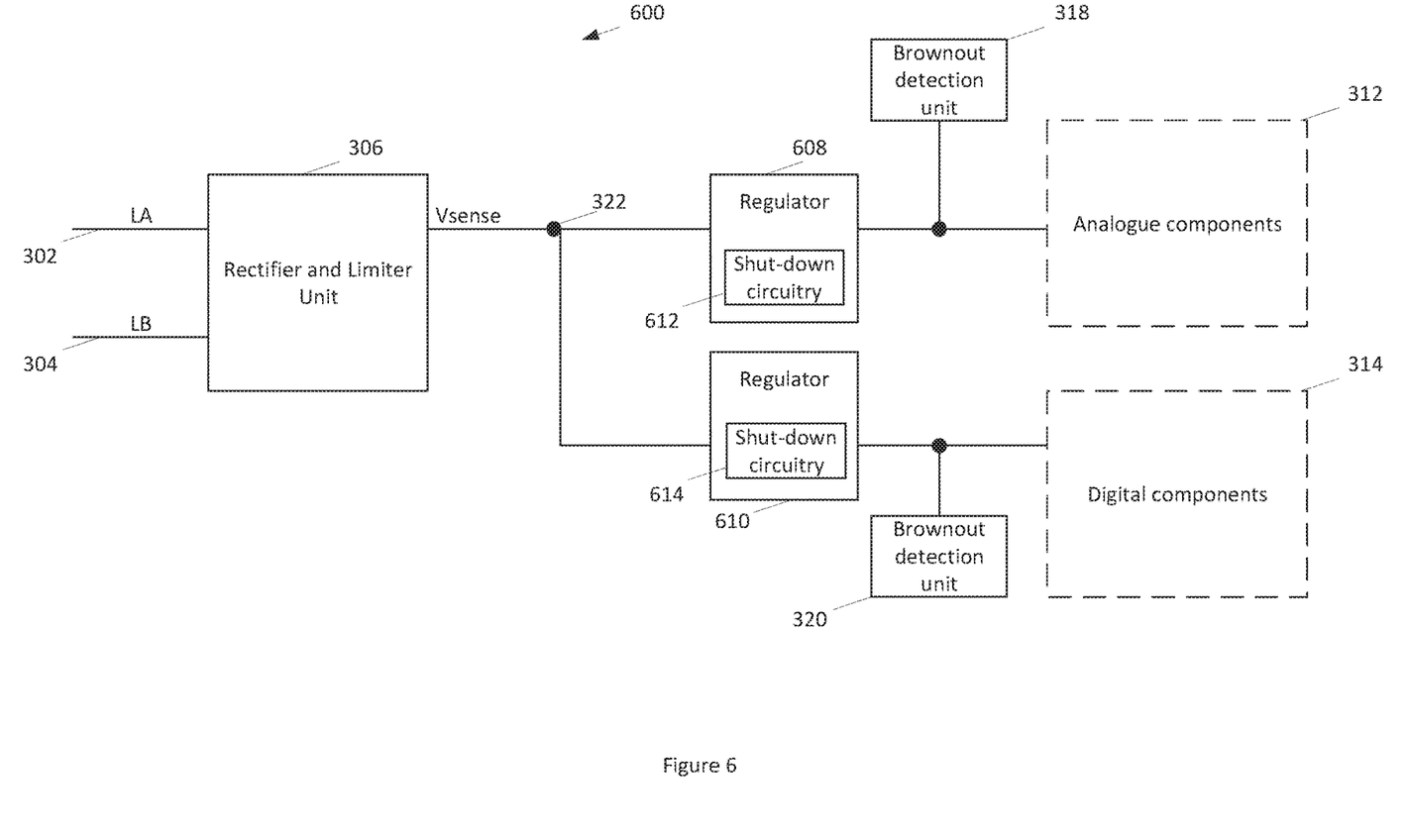
FIG. 6 shows a further example of regulator circuitry for outputting regulated voltages to analogue and digital components of the module.

In the examples described above, voltage-regulator circuitry 300 includes a switching element 316 to selectively couple the analogue components 312 to the antenna 104 and power harvesting unit 216. In an alternative arrangement, the functionality of the switching element 316 can be achieved using shut-down circuitry local to the regulator that supplies the voltage to the analogue components. This alternative voltage-regulation circuitry is shown in FIG. 6.

Voltage-regulator circuitry 600 shares similar components with circuitry 300, and like components are denoted by like reference numerals. The circuitry includes regulators 608 and 610. The regulators are arranged in parallel, i.e. both regulators 608 and 610 have inputs connectable to common node 322. The first regulator 608 is also coupled to analogue components of the module 108 (denoted at 312) and the second regulator 310 is coupled to digital components of the module 108 (denoted at 314).

Put another way, the circuitry 600 comprises a first branch and a second branch each connectable to common node 322 that is coupled to the rectifier and limiter unit 306. The first branch is coupled to the first voltage regulator 608 that is coupled to analogue components of the module, and the second branch is coupled to the second voltage regulator 610 that is coupled to digital components of the module.

The regulator 608 is arranged to output a first regulated voltage to the analogue components 312 and the regulator 610 is configured to output a second regulated voltage to the digital components 314. The second regulated voltage is lower than the first regulated voltage. The values of the first and second regulated voltages may vary by implementation.

As described above with respect to FIG. 3, brownout detection units 318 and 320 might be placed elsewhere on the first and second branches. For example, detection unit 318 might be placed, or located at the input of regulator 608, and detection unit 320 might be placed, or located at the input of regulator 610.

In contrast to circuitry 300, the circuitry 600 does not include a switching element for selectively coupling the circuit branches to the antenna. Instead, circuitry 600 includes shut-down circuitry 612 and 614 for controlling the operation of regulators 608 and 610 respectively. In this example, the shut-down circuitry is local to each regulator 608, 610. More specifically, shut-down circuitry 612 forms part of regulator 608 and shut-down circuitry 614 forms part of regulator 610. In other examples, the shut-down circuitry may be a separate component to the regulator.

The provision of shut-down circuitry 612 and 614 enables the operation of each regulator to be controlled independently of each other. Circuitry 612 operates to cause regulator 608 to enter a non-operative—i.e. inactive—state in which it does not output a regulated voltage. Similarly, circuitry 614 operates to cause regulator 610 to enter a non-operative state in which it does not output a regulated voltage. The non-operative state may be a low-powered state, or a shut-down state, When regulator 608 is in its non-operative state, the module's analogue components 312 are electrically disconnected from the antenna 104 and power harvesting unit 216; when regulator 610 is in its non-operative state, the module's digital components are electrically disconnected from the antenna 104 and power harvesting unit 216. Thus, the shut-down circuitries 612 and 614 can be used to electrically disconnect the analogue and digital components of the module 108 from the antenna and power-harvesting unit.

The circuitries 612 and 614 therefore facilitate different operational modes of the module 108 in a similar manner to the switching element 316 described above with respect to FIG. 3. Possible operational modes of the module 108 are: a first mode in which shut-down circuitry 612 and 614 is inactive, and thus both regulators 608 and 610 output regulated voltages; a second mode in which shut-down circuitry 612 is active to cause regulator 608 to be in its non-operative state, and shut-down circuitry 614 is inactive and thus regulator 614 is operational to output a regulated voltage; a third operational mode in which shut-down circuitry 612 is inactive and shut-down circuitry 614 is active; and a fourth operational mode in which both shut-down circuitry 612 and 614 are active and thus both regulators 608 and 610 are in their non-operative states. Module 108 operates in the first mode when the module is performing analogue processing or a combination of analogue and digital processing; in the second mode when the module is performing only digital processing; can operate in the third mode when the module is performing only analogue processing; and might operate in the fourth mode when the module is in a standby/low-power mode.

The operational mode of the module 108 may be controlled by a component of the module, such as the controller unit 212 or the power management unit 210, based on the processing being performed by the module. For example, during periods in which a combination of analogue and digital processing is to be performed, the component can cause the module 108 to operate in the first operational mode by sending a signal to deactivate shut-down circuitries 612 and 614; during periods in which only digital processing is to be performed, the component can cause the module to operate in its second operational mode by sending signals to activate shut-down circuitry 612 and deactivate shut-down circuitry 614; and during periods in which only analogue processing is to be performed, the component can cause the module to operate in its third operational mode by sending signals to deactivate circuitry 612 and activate circuitry 614.

Examples have been described herein in which the device is a smart card. It will be understood that the term 'card' does not imply any constraints with regards to its size, shape, thickness or function. The cards described herein could for example be a plastic card such as a banking card, an ID card, a passport etc. It will also be understood that each example described herein could be implemented within a device adopting a different form factor that is not card, for example a fob, a dongle, or a security token (e.g. a USB token). Alternatively, the devices described herein could be integrated into a communication device such as a mobile phone or smartphone; a wearable device, such as a bracelet, watch, a glove/pair of gloves, a pin (e.g. a brooch), a badge or some other contactless wearable device. Reference has also been made herein to a terminal. The terminal of any of the examples described could take any suitable form depending on implementation, for example a card reader such as a point-of-sale (POS) terminal, a cash register, an ATM machine, a computer, a smartphone etc.

Some cards described herein have been referred to as contactless cards. It will be understood that a contactless card, as described herein, refers to a card that can communicate with a reader through a contactless interface. However, each card described as a contactless card may also be capable of communication with a reader through direct physical contact. Thus, the term 'contactless' has not been used herein to exclude the possibility of contact functionality.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A biometric module implemented on a single integrated circuit chip, the module being configured to perform processing as part of a function associated with a device configured to perform contactless communication with a terminal, the module being configured to perform the processing in the analogue and digital domain and comprising:
   a power-harvesting unit configured to induce a voltage from a wireless signal received at an antenna of the device to power the module's processing;
   one or more components configured to perform processing in the digital domain;
   one or more components configured to perform processing in the analogue domain; and
   first and second voltage regulators arranged in parallel and each having inputs for receiving an input voltage generated from a voltage induced by the power-harvesting unit, the first voltage regulator being configured to output a first regulated voltage to the components of the module configured to perform processing in the analogue domain and the second voltage regulator being configured to output a second regulated voltage lower than the first regulated voltage to the components of the module configured to perform processing in the digital domain.

2. A biometric module as claimed in claim 1, wherein the module further comprises circuitry operable to selectively disconnect the one or more components configured to perform processing in the analogue domain from the power-harvesting unit.

3. A biometric module as claimed in claim 2, wherein the circuitry comprises a switching element controllable between an open position in which the input of the first voltage regulator is disconnected from the power-harvesting unit and a closed position in which the input of the first voltage regulator is electrically coupled to the power-harvesting unit.

4. A biometric module as claimed in claim 2, wherein the circuitry comprises shut-down circuitry operable to cause the first voltage regulator to enter a non-operative state.

5. A biometric module as claimed in claim 2, wherein the module further comprises a controller unit configured to control the circuitry in dependence on the processing performed by the module.

6. A biometric module as claimed in claim 5, wherein the controller unit is configured to cause the circuitry to disconnect the one or more components configured to perform processing in the analogue domain from the power-harvesting unit in response to determining that a block of upcoming processing is to be performed only by components operating in the digital domain.

7. A biometric module as claimed in claim 5, wherein the circuitry comprises a switching element controllable between an open position in which the input of the first voltage regulator is disconnected from the power-harvesting unit and a closed position in which the input of the first voltage regulator is electrically coupled to the power-harvesting unit, and wherein the controller unit is configured to cause the position of the switching element to adopt the closed position in response to determining that a block of upcoming processing is to be performed at least in part by components operating in the analogue domain and to cause the position of the switching element to adopt the open position in response to determining that a block of upcoming processing is to be performed only by components operating in the digital domain.

8. A biometric module as claimed in claim 5, wherein the circuitry comprises first shut-down circuitry operable to cause the first voltage regulator to enter a non-operative state and second shut-down circuitry operable to cause the second voltage regulator to enter a non-operative state, and wherein the controller unit is configured to selectively activate the first and/or second shut-down circuitries.

9. A biometric module as claimed in claim 8, wherein the controller unit is configured to: (i) activate the first shut-down circuitry to thereby cause the first voltage regulator to enter its non-operative state in response to determining that a block of upcoming processing is to be performed only by components operating in the digital domain; and (ii) activate the second shut-down circuitry to thereby cause the second voltage regulator to enter its non-operative state in response to determining that a block of upcoming processing is to be performed only by components operating in the analogue domain.

10. A biometric module as claimed in claim 5, wherein the circuitry comprises shut-down circuitry operable to cause the first voltage regulator to enter a non-operative state, and wherein the controller unit is configured to activate the shut-down circuitry to thereby cause the first voltage regulator to enter its non-operative state in response to determining that a block of upcoming processing is to be performed only by components operating in the digital domain.

11. A biometric module as claimed in claim 5, wherein the controller unit is configured to cause the input voltage to be equal to or greater than a first voltage level when the one or more components configured to perform processing in the analogue domain are coupled to the power-harvesting unit and to be equal to or greater than a second voltage level lower than the first voltage level when the one or more components configured to perform processing in the analogue domain are disconnected from the power-harvesting unit.

12. A biometric module as claimed in claim 2, wherein the module further comprises a brownout detector configured to detect brownout for the voltage supplied by the first voltage regulator, the brownout detector positioned so as to be disconnected from the power-harvesting unit when the one or more components configured to perform processing in the analogue domain are disconnected from the power-harvesting unit.

13. A biometric module as claimed in claim 2, wherein the module further comprises a second brownout detector configured to detect brownout for the voltage supplied by the second voltage regulator, the second brownout detector positioned as to be coupled to the power-harvesting unit independently of the operation of the circuitry.

14. A biometric module as claimed in claim 1, wherein the function associated with the device is biometric authentication of a user.

15. A biometric module as claimed in claim 14, wherein the module further comprises a sensor unit for capturing biometric data of the user.

16. A biometric module as claimed in claim 15, wherein the module further comprises a controller unit configured to control the circuitry in dependence on the processing performed by the module, and wherein the controller unit is configured to control the circuitry to electrically couple the one or more components configured to perform processing in the analogue domain to the power-harvesting unit when the sensor unit operates to capture biometric data of the user.

17. A biometric module as claimed in claim 16, wherein the module further comprises an integrated circuit configured to control the operation of the sensor unit, the integrated circuit comprising an analogue front end (AFE) for interfacing with the sensor unit that is configured to receive the first regulated voltage.

18. A biometric module as claimed in claim 15, wherein the module further comprises a controller unit configured to control the circuitry in dependence on the processing performed by the module, and wherein the controller unit is configured to control the circuitry to disconnect the one or more components configured to perform processing in the analogue domain from the power-harvesting unit when the module operates to process the captured biometric data of the user.

19. A biometric module as claimed in claim 1, wherein the module further comprises a voltage rectifier configured to receive the induced voltage supplied by the power-harvesting circuit and to output a rectified voltage as the input voltage to the first and second voltage regulators.

20. A device for contactless communication with a terminal, comprising:
 an antenna for receiving a wireless signal emitted by the terminal;
 a module configured to perform processing as part of a function associated with the device, the module being configured to perform the processing in the analogue and digital domain and comprising:
 a power-harvesting unit configured to induce a voltage from a wireless signal received at the antenna to power the module's processing; and first and second voltage regulators arranged in parallel and each having inputs for receiving an input voltage generated from a voltage induced by the power-harvesting unit, the first voltage regulator being configured to output a first regulated voltage to components of the module configured to perform processing in the analogue domain and the second voltage regulator being configured to output a second regulated voltage lower than the first regulated voltage to components of the module configured to perform processing in the digital domain.

* * * * *